US011420423B2

(12) United States Patent
Sauvinet

(10) Patent No.: US 11,420,423 B2
(45) Date of Patent: Aug. 23, 2022

(54) MOTOR VEHICLE WINDSCREEN IN WHICH THE ZONE OF THE FIELD OF A CAMERA HAS A REDUCED OPTICAL DISTORTION

(71) Applicant: SAINT-GOBAIN GLASS FRANCE, Courbevoie (FR)

(72) Inventor: Vincent Sauvinet, Grenoble (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 14 days.

(21) Appl. No.: 16/967,332

(22) PCT Filed: Feb. 13, 2019

(86) PCT No.: PCT/FR2019/050312
§ 371 (c)(1),
(2) Date: Aug. 4, 2020

(87) PCT Pub. No.: WO2019/158855
PCT Pub. Date: Aug. 22, 2019

(65) Prior Publication Data
US 2021/0031597 A1    Feb. 4, 2021

(30) Foreign Application Priority Data
Feb. 14, 2018   (FR) ...................................... 1851233

(51) Int. Cl.
*B32B 7/12*        (2006.01)
*B32B 17/10*       (2006.01)
(Continued)

(52) U.S. Cl.
CPC .. *B32B 17/10036* (2013.01); *B32B 17/10275* (2013.01); *B32B 17/10284* (2013.01);
(Continued)

(58) Field of Classification Search
CPC ........ B32B 17/10036; B32B 17/10275; B32B 17/10761; B60J 1/001
See application file for complete search history.

(56) References Cited

U.S. PATENT DOCUMENTS

| 2003/0155790 A1 | 8/2003 | Noguchi et al. |
| 2016/0243796 A1 | 8/2016 | Mannheim et al. |
| 2019/0030865 A1* | 1/2019 | Aoki ................. B32B 17/10357 |

FOREIGN PATENT DOCUMENTS

| EP | 1 464 632 A1 | 10/2004 |
| EP | 3 118 036 A1 | 1/2017 |

(Continued)

OTHER PUBLICATIONS

International Search Report as issued in International Patent Application No. PCT/FR2019/050312, dated May 29, 2019.

*Primary Examiner* — Elizabeth E Mulvaney
(74) *Attorney, Agent, or Firm* — Pillsbury Winthrop Shaw Pittman LLP

(57) ABSTRACT

A laminated glazing includes two glass sheets adhesively bonded by an intermediate adhesive layer, which glazing is associated with a camera, the laminated glazing including an opaque decoration resulting from the superposition of a first decoration on the intermediate adhesive layer, containing a first zone without decoration placed in the field of the camera, and of a second decoration including an enamel formed into a dégradé edge zone and of an unapertured strip, bounding a free zone of dimension smaller than that of the first decoration, on which the latter is superposed during the assembly of the laminated glazing, the unapertured strip having a width comprised between 1 and 30 mm, and the smallest dimension of said free zone not being smaller than 50 mm; three processes for its manufacture and its use as a motor-vehicle windshield.

15 Claims, 1 Drawing Sheet

(51) Int. Cl.
    *B60J 1/00*           (2006.01)
    *B60J 1/02*           (2006.01)
    *B60R 11/04*         (2006.01)
    *B60R 11/00*         (2006.01)

(52) U.S. Cl.
    CPC .. *B32B 17/10348* (2013.01); *B32B 17/10761* (2013.01); *B32B 17/10899* (2013.01); *B60J 1/001* (2013.01); *B60J 1/02* (2013.01); *B60R 11/04* (2013.01); *B32B 2250/03* (2013.01); *B32B 2255/10* (2013.01); *B32B 2605/00* (2013.01); *B60R 2011/0026* (2013.01)

(56) References Cited

FOREIGN PATENT DOCUMENTS

| | | |
|---|---|---|
| FR | 2 928 929 A1 | 9/2009 |
| FR | 2 969 957 A1 | 7/2012 |
| FR | 2 974 103 A1 | 10/2012 |
| WO | WO 2014/020261 A1 | 2/2014 |
| WO | WO 2016/097044 A1 | 6/2016 |

* cited by examiner

MOTOR VEHICLE WINDSCREEN IN WHICH THE ZONE OF THE FIELD OF A CAMERA HAS A REDUCED OPTICAL DISTORTION

CROSS-REFERENCE TO RELATED APPLICATIONS

This application is the U.S. National Stage of PCT/FR2019/050312, filed Feb. 13, 2019, which in turn claims priority to French patent application number 1851233 filed Feb. 14, 2018. The content of these applications are incorporated herein by reference in their entireties.

The present invention relates to a laminated glazing, and in particular to a motor-vehicle windshield.

Currently a peripheral enameled zone exists on the perimeter of windshields. The function of this enameled zone of 20-40 mm width is to hide the zone in which the windshield is adhesively bonded to the vehicle body. This function is performed whether the enamel is on face 2, face 3 or face 4 of the laminated glazings (by convention, the faces of the glass sheets of a windshield or more generally of a laminated glazing are numbered starting from 1 for the face that makes direct contact with the exterior atmosphere). Most often this enamel is positioned on face 2 so as to mask any small defects on the edges of the bonding PVB (polyvinyl butyral: intermediate adhesive layer) that may appear over time.

From the same reasons of esthetics when this bond is looked at from outside the automobile, a small circle of enamel is also positioned in the location in which the base of the interior rearview mirror is bonded.

Since the turn of the century other accessories such as light or rain sensors that are attached to the windshield have become more common; as known, the function of said sensors is to detect rain in order to actuate the windscreen wipers, and to evaluate light level in order to actuate the lights of the vehicle (headlights), respectively. These sensors have naturally been placed close to the rearview-mirror base and in the field of the windscreen wipers so as, on the one hand, to ensure the reproducibility of the light-level measurement and, on the other hand, to ensure that the wiping of the windscreen wipers is controlled intelligently.

Since the start of the decade, sometimes a camera has also been added. The latter option will become more common with the adoption of driver-assistance systems and self-driving vehicles. To ensure the aesthetics of the automobile seen from the exterior, the single small circle of enamel of a few centimeters in diameter that hid the base of the rearview mirror has become an enameled zone around the rearview-mirror base that may be as large as a few hundred $cm^2$ in size, that includes all of the sensors and their interconnects and that currently is associated with the peripheral enamel zone, usually forming a wide tongue of enamel descending from the peripheral enamel strip located at the junction of the windshield and the roof of the vehicle to below the rearview-mirror base adhesively bonded to the windshield.

Such a camera associated with such a windshield is an accessory that will become more commonplace. Its function is to assist the driver with driving by detecting risks and in fine to prevent accidents. The specifications with respect to camera performance will become more demanding as the role played by this assistance in driving an automobile becomes more important and in particular as the precision with which the position of detected objects must be determined increases. This positional precision requires on the one hand the camera to be calibrated during its mounting on the windshield, and on the other hand the portion of the windshield that is located in the field of the camera to be of sufficient optical quality. Up to recently the specification has been 400 millidiopters (mdpt) (maximum tolerable optical distortion). For new automobile models, this specification is about 100 mdpt. This level of distortion is very difficult to achieve in the camera zone when this zone is an enclave in the enameled zone. Specifically, in the vicinity of an enameled zone and in particular at a distance of less than 30-40 mm, optical distortions of possibly as much as 400 mdpt are observed, which distortions increase as the enamel portion is got closer to. These optical distortions are a result of the fact that it is impossible to avoid subjecting this zone of the glass to high temperatures during the bake of the enamel, which is located at a relatively small distance therefrom. In particular, when the zone of the windshield that is located in the field of the camera is a transparent enclave in an enameled zone the largest dimension of which is smaller than 60-80 mm, all of the transparent zone has a distortion of possibly as much as 400 mdpt.

The company Saint-Gobain Glass France has developed in the past a PVB printing technology described in patent applications FR2928929, FR2969957, FR2974103 and WO2014020261. This technology consists in depositing on the PVB a compatible ink, the ink possibly being black. Since PVB is a soft and rough material it is not possible to print this ink with the same resolution as obtained with an enamel on a smooth and planar glass surface. In the case of enamel, the resolution limit is essentially related to the mesh count of the screen-printing screen. This resolution limit meets the aesthetic requirements of motor-vehicle manufacturers. In the case of printing on PVB, the roughness of the latter does not allow a level of resolution to be obtained that satisfies every motor-vehicle manufacturer and in particular motor-vehicle manufacturers who sell top-of-the-range vehicles in which the most sophisticated cameras are installed. This unsatisfactory resolution is noticeable at the boundary between the enamel portion and the glass portion, especially seeing as, in the location of this boundary, to make it pleasing to the eye, a dégradé of dots is provided, the outlines of which dots may become imprecise in the case of use of the PVB printing technology. Moreover, again to meet the quality specifications of motor-vehicle manufacturers, if two different technologies are used to produce the black decoration of windshields it is necessary for the relative position of one with respect to the other to be controlled, this being difficult to do. The precision with which an intermediate film made of PVB or another material may be positioned is of the order of one millimeter whereas alignment of screen-printed dots requires a positional precision of one tenth of a millimeter. This second problem is not uniquely related to the use of the PVB printing technology, but also to the use of any other technology in which a decoration associated with one of the intermediate adhesive layers of the windshield is employed. It is for example encountered during the insertion of PVB or PET (polyethylene terephthalate) films bearing all or some of the decoration.

The invention provides a means for solving this problem, i.e. for producing a black or otherwise opaque decoration while preserving an optical quality that is sufficient to meet the needs in respect of camera precision.

The invention consists:
  on the one hand in printing by screen-printing only the perimeter of the enamel tongue that descends from the peripheral enamel strip located at the junction of the windshield and of the roof of the vehicle to below the rearview-mirror base adhesively bonded to the windshield; this perimeter being defined by a dégradé of dots and an unapertured strip on the interior side of this array of dots, the width of which may be comprised between 1 mm and 40 mm;

and on the other hand in using a decoration located on the intermediate adhesive layer to produce the decoration inside this zone, while making it so that this decoration contains, in the field of the camera, of the rain sensor, of the light sensor and optionally of other sensors requiring the facing glass to be transparent, a zone without decoration.

One subject of the invention is therefore a laminated glazing comprising a first glass sheet, respectively a second glass sheet, intended to be positioned toward the exterior, respectively the interior, of an enclosure in mounted position, which sheets are adhesively bonded to each other by an intermediate adhesive layer, the main faces of the glass sheets being numbered conventionally 1 to 4 from the exterior to the interior of the enclosure in mounted position, a camera being associated with the laminated glazing on the interior side of the enclosure with a view to evaluating the exterior environment of the enclosure, characterized in that the laminated glazing comprises an opaque decoration resulting from the superposition:

of a first decoration on the intermediate adhesive layer, containing a first zone without decoration needing to be placed in the field of the camera, and of a second decoration on face 2, 3 or 4 of said glass sheets consisting of an enamel formed into a dégradé edge zone if the latter exists and of an unapertured strip, bounding a free zone (without enamel) of dimension smaller than that of the first decoration, on which the latter is superposed during the assembly of the laminated glazing, in that the unapertured strip has a width comprised between 1 and 30 mm, and in that the smallest dimension of said free zone is not smaller than 50 mm.

The evaluation of the exterior environment by the camera in particular consists, as is known, in the detection of any obstacle, pedestrian, two-wheeled vehicle, or any other type of vehicle in front thereof, and in the precise measurement of their distance to the glazed enclosure, to the motor vehicle, etc.

By virtue of the invention, the positional precision required to make the decoration on the intermediate adhesive layer aesthetically acceptable is decreased; it is enough to superpose decorations located on a glass sheet and on the intermediate adhesive layer.

In addition, the optical distortion in the camera zone is the same as would be obtained in a zone without enamel, because the zone of the enameled glass sheet in the field of the camera is not subjected during the bake of the enamel to an excessive temperature liable to degrade its optical quality. The reason for this is its relatively large distance from the enameled zone.

According to preferred features of the laminated glazing of the invention:

the unapertured strip has a width at least equal to 2 mm and at most equal to 10 mm; this range of values is optimal with respect to guaranteeing easy superposition of the first and second decorations and to obtaining an assembly that is visually perfect;

the smallest dimension of said free zone is not smaller than 70 mm; this value further guarantees that the distance between the zone of the field of the camera and the enamel is large, and thus that the optical quality of this zone of the enameled glass sheet and of the laminated glazing is maximal;

said first decoration is of dimensions 1 to 20 mm, preferably 2 to 8 mm, larger than those of said free zone; this value, conjointly with the value of the width of said unapertured strip, makes it possible to guarantee that the first and second decorations are easy to superpose and to obtain an assembly that is visually perfect, as mentioned above;

the second decoration is formed on the periphery of the laminated glazing, comprises an enamel tongue that descends, in mounted position, from the upper side of the laminated glazing in mounted position, at its junction with a roof portion of the enclosure, to below the base of a rearview mirror adhesively bonded to the laminated glazing, and the enamel tongue consists of said dégradé edge zone if the latter exists and of said unapertured strip;

the first or second decoration comprises a second zone without decoration intended to be associated with a rain sensor (which may automatically control the actuation of the windscreen wipers);

the first or second decoration comprises a third zone without decoration intended to be associated with a light sensor (which may automatically control the actuation of the headlights);

at least two among the first, second and third zones without decoration are merged into one;

the second and/or the third zone(s) without decoration is (are) circumscribed in said enamel tongue, i.e. in the central upper zone of the laminated glazing (the zone of the rearview-mirror base and the camera).

Other subjects of the invention are:

a process for manufacturing a laminated glazing such as described above, characterized in that it comprises an operation consisting in printing the first decoration on the intermediate adhesive layer by screen-printing or equivalent;

a process for manufacturing a laminated glazing such as described above, characterized in that it comprises an operation consisting in inserting into the intermediate adhesive layer a printed film of polyethylene terephthalate (PET) or equivalent, forming the first decoration;

a process for manufacturing a laminated glazing such as described above, characterized in that it comprises an operation consisting in inserting into the intermediate adhesive layer an thin, colored intermediate adhesive film such as of polyvinyl butyral (PVB), forming the first decoration.

Another subject of the invention is the use of a laminated glazing such as described above as a motor-vehicle windshield.

The invention will be better understood in light of the following description of the appended drawings, in which.

Figure 1:
FIG. 1 shows a first decoration on an intermediate adhesive layer of polyvinyl butyral (PVB)

With reference to FIG. 1, a first decoration 1 has been produced in black ink by screen-printing on an intermediate adhesive layer of PVB intended to adhesively bond two glass sheets of a motor-vehicle windshield. The first decoration (1) comprises a trapezoidal first zone without decoration (11) corresponding to the field zone of a camera associated with the windshield.

Figure 2:
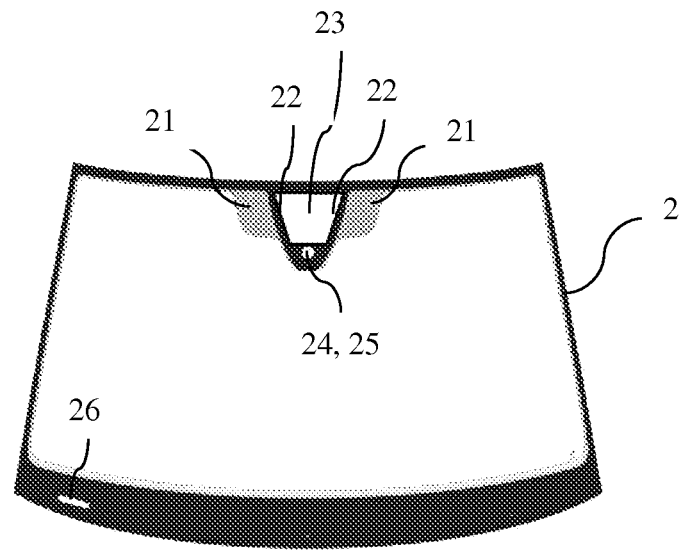
FIG. 2 shows a second decoration on a curved glass sheet.

In FIG. 2, a curved soda-lime float glass sheet intended to form the exterior glass sheet of the windshield comprises a peripheral second decoration 2 made of black enamel on its concave face (face 2 of the windshield).

In the zone in which the base of an interior rearview mirror is adhesively bonded, a central upper tongue of enamel consists of an outline formed from a dégradé of dots 21 and an unapertured strip 22 of width comprised between 2 and 10 mm, bounding a free zone without enamel 23, of the same shape as the first decoration 1 but of dimensions smaller by 2 to 8 mm than those of said decoration 1.

The smallest dimension of the free zone 23 is not smaller than 70 mm.

The second decoration 2 comprises merged second and third zones without decoration 24, 25 facing light and rain sensors that are connected to the windscreen wipers and to the headlights of the motor vehicle.

On the lower peripheral strip of the second decoration 2, a fourth zone without decoration 26 allows the vehicle identification number (VIN) and/or technical features of the windshield to be seen from the exterior of the motor vehicle.

Figure 3:
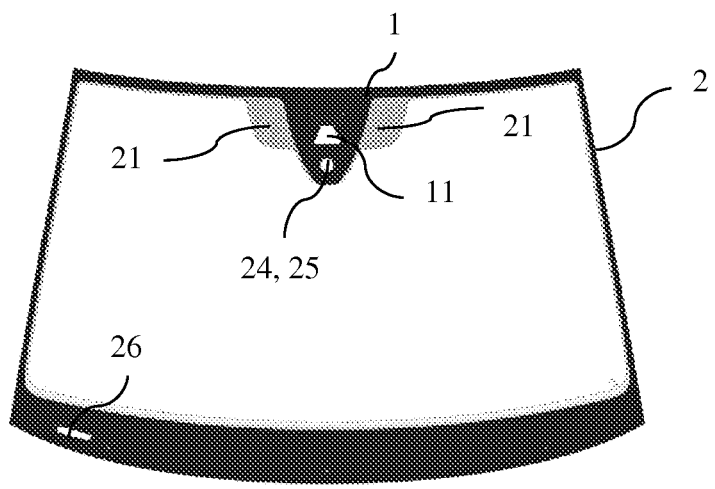
FIG. 3 shows a motor-vehicle windshield in which the intermediate adhesive layer of FIG. 1 is superposed on the glass sheet of FIG. 2.

With reference to FIG. 3, the first decoration 1 may easily be aligned with the free zone without enamel 23 of the second decoration 2 by aligning it perfectly with the unapertured strip 22, which it covers and with which it blends.

In the trapezoidal first zone without decoration 11, by measurement of optical power in transmission, the horizontal optical distortion is determined to be equal to 78 mdpt.

The invention claimed is:

1. A laminated glazing comprising a first glass sheet, respectively a second glass sheet, intended to be positioned toward an exterior, respectively an interior, of an enclosure in mounted position, which first and second sheets are adhesively bonded to each other by an intermediate adhesive layer, the main faces of the first and second glass sheets being numbered conventionally 1 to 4 from the exterior to the interior of the enclosure in mounted position, a camera being associated with the laminated glazing on the interior side of the enclosure with a view to evaluating the exterior environment of the enclosure, wherein the laminated glazing comprises an opaque decoration resulting from the superposition:
of a first decoration on the intermediate adhesive layer, containing a first zone without decoration needing to be placed in the field of the camera, and
of a second decoration on face 2, 3 or 4 of said first and second glass sheets consisting of an enamel of an unapertured strip and optionally of a dégradé edge zone, the unapertured strip bounding a free zone without enamel of dimension smaller than that of the first decoration, on which the latter is superposed during the assembly of the laminated glazing,
wherein the unapertured strip has a width comprised between 1 and 30 mm, and wherein the smallest dimension of said free zone is not smaller than 50 mm.

2. The laminated glazing as claimed in claim 1, wherein the unapertured strip has a width at least equal to 2 mm.

3. The laminated glazing as claimed in claim 1, wherein the unapertured strip has a width at most equal to 10 mm.

4. The laminated glazing as claimed in claim 1, wherein the smallest dimension of said free zone is not smaller than 70 mm.

5. The laminated glazing as claimed in claim 1, wherein said first decoration is of dimensions 1 to 20 mm larger than those of said free zone.

6. The laminated glazing as claimed in claim 1, wherein the second decoration is formed on a periphery of the laminated glazing, comprises an enamel tongue that descends, in mounted position, from the upper side of the laminated glazing in mounted position, at its junction with a roof portion of the enclosure, to below the base of a rearview mirror adhesively bonded to the laminated glazing, and wherein the enamel tongue consists of said optional dégradé edge zone and of said unapertured strip.

7. The laminated glazing as claimed in claim 1, wherein the first decoration or the second decoration comprises a second zone without decoration intended to be associated with a rain sensor.

8. The laminated glazing as claimed in claim 7, wherein the first decoration or the second decoration comprises a third zone without decoration intended to be associated with a light sensor.

9. The laminated glazing as claimed in claim 8, wherein at least two among the first, second and third zones without decoration are merged into one.

10. The laminated glazing as claimed in claim 8, wherein the second and/or the third zone without decoration is (are) circumscribed in said enamel tongue.

11. A process of manufacturing a laminated glazing as claimed in claim 1, further comprising an operation consisting in printing the first decoration on the intermediate adhesive layer by screen-printing or equivalent.

12. A process for manufacturing a laminated glazing as claimed in claim 1, further comprising inserting into the intermediate adhesive layer a printed film of polyethylene terephthalate or equivalent, forming the first decoration.

13. A process for manufacturing a laminated glazing as claimed in claim 1, further comprising inserting into the intermediate adhesive layer a thin colored intermediate adhesive film such as of polyvinyl butyral (PVB), forming the first decoration.

14. A method comprising utilizing a laminated glazing as claimed in claim 1 as a motor-vehicle windshield.

15. The laminated glazing as claimed in claim 5, wherein said first decoration is of dimensions 2 to 8 mm larger than those of said free zone.

* * * * *